VOLTAGE REGULATOR CIRCUIT

Filed June 10, 1958

United States Patent Office 2,997,622 Patented Aug. 22, 1961

2,997,622

VOLTAGE REGULATOR CIRCUIT

Harry W. Claypool, New Brunswick, N.J., assignor to Westinghouse Electric Corporation, East Pittsburgh, Pa., a corporation of Pennsylvania Filed June 10, 1958, Ser. No. 741,064
6 Claims. (Cl. 315—27)

This invention relates to high voltage, direct-current, power supply circuits for cathode ray tubes, and has as an object to maintain constant the voltages supplied to the second anodes of television picture tubes.

It is desirable for several reasons to maintain the voltage at the second anode of a television picture tube constant. Among these reasons are maintaining sharpness of focus at high beam currents, maintaining ion trap efficiency throughout the picture tube conduction range, maintaining a constant picture size, and maintaining scanning linearity.

It has been proposed to provide regulation for the voltage supplied to the second anode of a picture tube by a flyback circuit, by passing the current that charges the filter capacitor of the high voltage rectifier, through a small impedance in series with the filter capacitor. The voltages across the impedance are peak detected and applied to a control tube which adjusts the voltage on the screen grid of the horizontal output tube of the flyback circuit, causing the output tube to supply power to the flyback transformer in proportion to the beam current.

One fault of such a voltage regulating circuit is that two voltages appear across the impedance, one voltage resulting from the capacitor charging current, and the other voltage being a differentiated waveform of the retrace pulse coupled in from the flyback transformer through the capacitance of the high-voltage rectifier. The latter voltage does not decrease to zero at zero beam current so that the control voltage does not decrease to zero when there is zero beam current.

Another fault of such a voltage regulating circuit is that the control voltage is a non-linear function of the beam current of the picture tube, and when sufficient compensation is employed to make the circuit effective as a voltage regulator, changes in picture width, and instability may occur when beam current increases.

Still another fault of such a voltage regulating circuit is that there is no provision for adjusting the amount of compensation applied to the screen grid of the horizontal output tube.

A feature of my invention is that the control voltage of such a control circuit is made a linear function of the beam current, and the control voltage is made to drop substantially to zero when the beam current is zero, by providing a combination feedback and delay circuit from the control tube to the peak detector.

Another feature of my invention is that I provide a tapped load resistance in the output circuit of the control tube, the resistance value of which can be selected to provide the correct amount of compensation to the screen grid of the horizontal output tube.

My invention will now be described with reference to the annexed drawings, of which:

Figure 1:
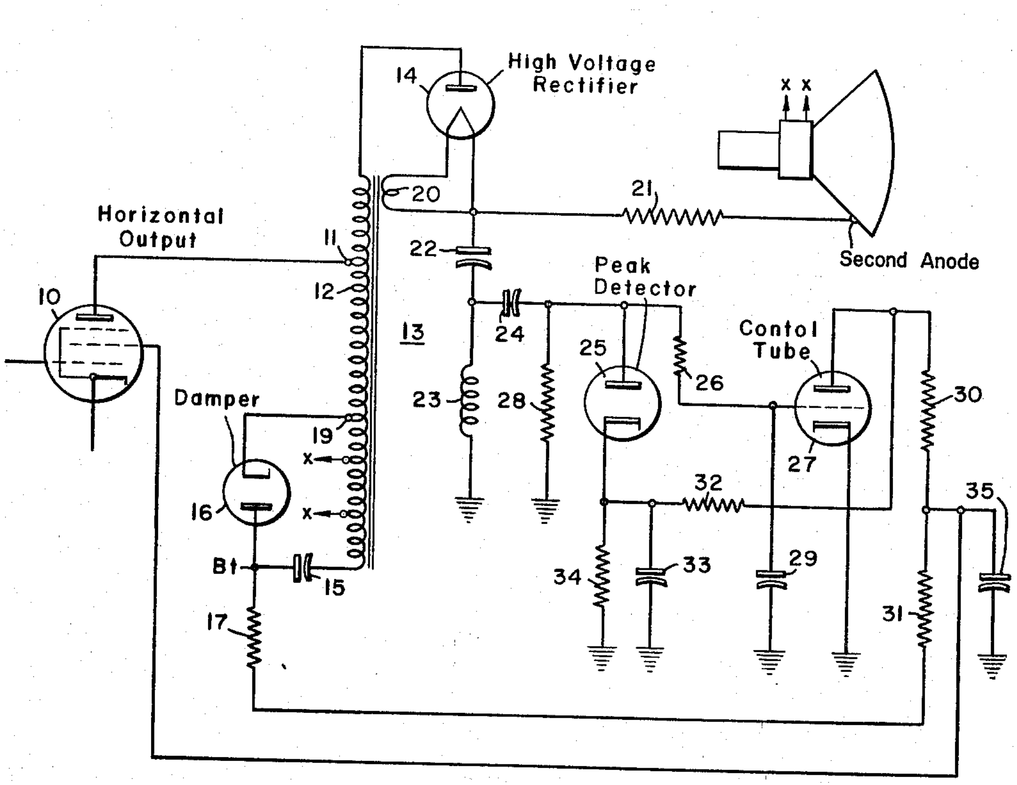
FIGURE 1 is a circuit schematic of one embodiment of my invention.

Referring first to FIG. 1, a horizontal output tube 10 of the usual beam power type has its anode connected to a tap 11 on auto-transformer winding 12 of flyback transformer 13. The end of the winding 12 nearest the tap 11 is connected to the anode of high voltage rectifier tube 14. The other end of the winding 12 is connected through capacitor 15 to the anode of damper diode 16, and to B+. The cathode of the damper diode 16 is connected to a tap 19 on the winding 12. The filament-cathode of the rectifier tube 14 is connected to a filament winding 20 of the transformer 13, and through a filter resistor 21 to the second anode of a television picture tube which is shown in FIG. 1.

Filter capacitor 22 is connected to the cathode of the rectifier tube 14 and to one end of coil 23, the other end of the coil 23 being connected to ground. The end of the coil 23 which is connected to the capacitor 22 is also connected through coupling capacitor 24 to the anode of peak detector tube 25, and through resistor 26 to the control grid of control tube 27. Resistor 28 is connected between the anode of the diode 25 and ground. The control grid of the triode 27 is connected through capacitor 29 to ground. The cathode of the triode 27 is grounded. The anode of the triode 27 is connected through a voltage divider consisting of the series-connected load resistors 30 and 31 and dropping resistor 17 to B+. The junction of the resistors 30 and 31 is connected to the screen grid of the horizontal output tube 10, and is connected to ground through bypass capacitor 35. The control tube 27 acts as a variable resistance between the screen grid of the output tube 10 and ground. When the conductance of the tube 27 decreases, the voltage at the screen grid of the output tube increases.

The control tube 27 is also connected to the peak detector tube 25 by a combined feedback and delay network consisting of a resistor 32 connected to the anode of the tube 27 and to the cathode of the tube 25, a resistor 34 connected between the cathode of the tube 25 and ground, and a bypass capacitor 33 shunted across the resistor 34.

The input circuit of the horizontal output tube 10 is connected to a horizontal oscillator which is not shown. The flyback transformer would have a winding connected to a horizontal deflection yoke which is shown in FIG. 1.

In operation, during the horizontal retrace periods when the output tube 10 is cut off, the collapsing magnetic field of the flyback transformer induces voltage pulses in the winding 12 which are rectified by the rectifier tube 14, and supplied through the filter resistor 21 to the second anode of the associated picture tube, the filter capacitor 22 smoothing out the voltage ripples. The charging current of the filter capacitor 22 flows through the coil 23 to ground, providing a voltage across the coil 23 which is proportional to the capacitor charging current and to the beam current of the picture tube.

The picture tube beam current varies with changes in picture shading from black to white. For an all black picture, the beam current is practically zero. For an all white picture, the beam current is maximum and may be several hundred microamperes.

The combination of the capacitor 24, the resistor 28 and the diode 25 peak detects the positive pulse across the coil 23. An increase in the voltage of this positive pulse results in negative bias voltage developed across the diode 25 and supplied through the integrating filter network consisting of the resistor 26 and the capacitor 29 to the control grid of the control tube 27. The conduction of the control tube 27 decreases with an increase in negative bias applied to its grid, and causes the screen grid voltage of the output tube 10 to increase. This, in turn, causes the tube 10 to supply more power to the flyback transformer 13 to provide an increase in second anode voltage for the picture tube.

The proper compensating voltage supplied to the screen grid of the output tube 10 can be adjusted by selecting proper values for the load resistors 30 and 31.

Figure 2:
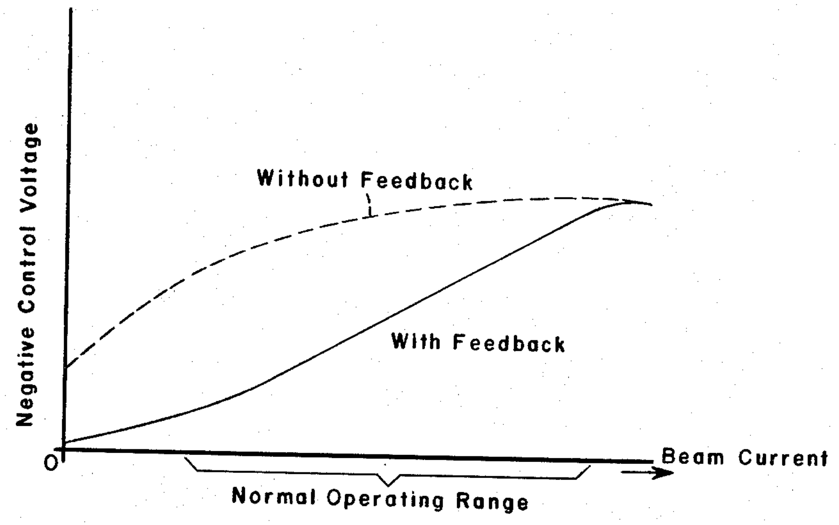
FIG. 2 is a graph showing voltages in the circuit of FIG. 1.

Without the combined feedback and delay network between the tubes 27 and 25, and consisting of the resistors 32 and 34 and the capacitor 33, the voltage applied to the control grid of the control tube is shown by the dashed line curve of FIG. 2. This curve is seen to be non-linear, and it also shows that there is appreciable undesired control voltage at zero beam current. The solid line curve of FIG. 2 shows the control voltage at the control grid of the control tube 27 when the feedback circuit 32, 34 is used. The control voltage is seen to be substantially linear throughout the normal operating range of the associated cathode ray tube.

Transistors and crystal diodes could, of course, be used instead of the tubes 27 and 25 respectively, and in the annexed claims, an anode is to be considered as equivalent to the collector of a transistor, and a cathode is to be considered as equivalent to the emitter of a transistor.

I claim as my invention:

1. In a high voltage power supply including a flyback transformer, a driver tube having its anode connected to said transformer, said tube having a screen grid electrode, a high voltage rectifier connected to said transformer, a filter capacitor connected at one side to said rectifier, and an impedance connected between the other side of said capacitor and ground, the combination of a peak detector connected across said impedance, a control device having an input circuit connected to said detector, and having an output circuit connected to said screen grid electrode for supplying operating potential thereto, and a feedback circuit connecting said output circuit of said control device to said detector.

2. In a high voltage power supply including a flyback transformer, a driver tube having an anode connected to said transformer, said tube having a screen grid, a high voltage rectifier connected to said transformer, a filter resistor for connecting said rectifier to a load, connected to said rectifier, a filter capacitor connected at one side to said rectifier and resistor, an inductance connection between the other side of said capacitor and ground, the combination of a peak detector having an anode connected to the junction of said capacitor and said inductance, and having a cathode, a control device having a control electrode connected to said anode of said detector, and having a grounded cathode, said anode of said control device being connected to said screen grid of said driver tube, and a feedback circuit between said control device and said peak detector, said feedback circuit comprising a resistor connected between said anode of said control device and said cathode of said detector, a resistor connecting said cathode of said peak detector to ground, and a capacitor shunted across said last mentioned resistor.

3. The invention claimed in claim 2 in which said anode of said control device is connected to B+ through a plurality of series-connected resistors, and in which said screen grid of said driver tube is connected to a junction of a pair of said resistors.

4. In electronic apparatus including a cathode ray tube having an anode, and deflecting coils for deflecting the beam of said tube, a system for producing a sawtooth current wave for deflecting the beam of said tube and for producing high voltage for accelerating the beam of said tube comprising, an oscillator including an electron discharge valve having plate and screen grid electrodes and inductance means, said plate electrode being connected to said inductance means for producing a sawtooth current wave therein, said inductance means including a winding connected to the deflecting coils of said cathode ray tube for producing a fluctuating magnetic field therethrough, rectifier means connected to said inductance means for rectifying the high voltage pulses produced therein to develop a high direct current voltage therefrom, said rectifier means including a load circuit connected to the anode of said cathode ray tube, with the anode drawing varying load current from said rectifier means, said load circuit including a high voltage filter capacitor and impedance means connected in series therewith between said rectifier and a point of reference potential for developing voltage pulses which vary as a function of cathode ray beam current, peak detector means connected to said impedance means for deriving a direct current control potential varying as a function of beam current, a control device having a control electrode connected to said detector and an output circuit connected to said screen grid electrode for controlling the operating potential applied thereto in response to variations of said beam current, and feedback means coupled between said output circuit and said detector to apply a varying reverse bias to said detector so that the minimum pulse amplitude to render said detector conductive is increased as said cathode ray beam current increases.

5. In combination with a cathode ray tube, a high voltage power supply comprising a flyback transformer, circuit means including a driver tube having a screen grid electrode for applying a sawtooth current wave to said transformer whereby high voltage retrace pulses are produced thereacross, rectifying means for producing a high direct current voltage in response to said pulses, said rectifying means including a rectifier device, a filter capacitor and an impedance means connected in series in that order across said transformer with the junction of said capacitor and rectifier device being connected to the anode of said cathode ray tube so that said capacitor is recurrently charged by said retrace pulses with the magnitude of the capacitor charging current pulses being a function of the cathode ray beam current, detector means coupled to said impedance means for developing a direct current control potential corresponding to the peak amplitudes of said capacitor charging current pulses, amplifier means having an input circuit connected to said detector and an output circuit connected to said screen grid electrode for varying the potential applied thereto in response to variations in said control potential, and degenerative feedback means connected between said amplifier output circuit and said detector to apply varying reverse bias to said detector so that the control potential applied to said amplifier is caused to vary as a substantially linear function of cathode ray beam current through a predetermined range of beam current variation.

6. In a cathode ray tube beam deflection and high voltage supply system, a flyback transformer including an inductive winding having at least first and second terminals; means including a driver tube of the screen grid type for cyclically passing a nonsinusoidal waveform current through said winding whereby high voltage pulses are produced between said first and second terminals; means for applying a variable direct current energizing voltage to the screen grid electrode of said drive tube with the magnitude of said energizing voltage affecting the amplitude of said high voltage pulses; a high voltage rectifying circuit for supplying cathode ray beam current to the anode of said cathode ray tube, said rectifying circuit including a high voltage rectifier, a high voltage filter capacitance and an alternating current pulse responsive impedance means connected in series in the named order between said first and second terminals so that said filter capacitance is recurrently charged by said high voltage pulses with the amplitude of the charging current pulses through said capacitance and said impedance means being a function of the cathode ray beam current; peak detector means coupled across said pulse responsive impedance means for producing a direct current control potential which varies as a function of the amplitudes of said charging current pulses; amplifier means having an input circuit connected to said detector and an output circuit connected to said screen grid electrode for varying the potential applied thereto in response to variations in said control potential, so that the voltage applied to said screen grid increases in response to increasing cathode ray beam current to thereby compensate for increased loading of said high voltage rectifying circuit; and degenerative feedback means connected between said amplifier output circuit and said detector to apply varying reverse bias to said detector so that the control potential applied to said amplifier is caused to vary as a substantially linear function of cathode ray beam current through a predetermined range of beam current variation.

References Cited in the file of this patent

UNITED STATES PATENTS

| | | |
|---|---|---|
| 2,565,621 | Olson | Aug. 28, 1951 |
| 2,700,747 | Finkelstein | Jan. 25, 1955 |
| 2,856,576 | Hook | Oct. 14, 1958 |
| 2,871,288 | Thomas | Jan. 27, 1959 |
| 2,932,765 | Messina | Apr. 12, 1960 |